United States Patent [19]

Kolner et al.

[11] Patent Number: 5,453,871
[45] Date of Patent: Sep. 26, 1995

[54] TEMPORAL IMAGING WITH A TIME LENS

[75] Inventors: Brian H. Kolner, Woodside; Moshe Nazarathy, Palo Alto, both of Calif.

[73] Assignee: Hewlett-Packard Company, Palo Alto, Calif.

[21] Appl. No.: 366,007

[22] Filed: Jun. 14, 1989

[51] Int. Cl.$^6$ ............................ G02F 1/01; G02B 5/04; H04B 10/04
[52] U.S. Cl. ................. 359/238; 359/264; 359/279; 359/615; 359/183; 359/184
[58] Field of Search ............................ 350/96.18, 162.12, 350/168, 432; 372/29, 30, 31, 32, 101; 455/600; 359/109, 123, 238, 276, 615, 896, 135, 264, 559, 181, 182, 183, 184, 278, 279, 833

[56] References Cited

U.S. PATENT DOCUMENTS

| | | | |
|---|---|---|---|
| 3,283,080 | 11/1966 | Caputi, Jr. . | |
| 3,354,456 | 11/1967 | Caputi, Jr. . | |
| 4,218,628 | 8/1980 | Harris | 307/426 |
| 4,655,547 | 4/1987 | Heritage et al. | 350/96.11 |
| 4,746,193 | 5/1988 | Heritage et al. | 350/168 |
| 4,750,809 | 6/1988 | Kafka et al. | 350/168 |
| 4,764,930 | 8/1988 | Bille et al. | 372/25 |
| 4,776,678 | 10/1988 | Barthelemy et al. | 350/403 |
| 4,866,699 | 9/1989 | Brackett et al. | 370/1 |
| 4,918,751 | 4/1990 | Pessot et al. | 455/600 |
| 4,928,316 | 5/1990 | Heritage et al. | 455/600 |

FOREIGN PATENT DOCUMENTS

| | | | |
|---|---|---|---|
| 3729845 | 3/1989 | Germany | 350/432 |
| 0069020 | 4/1986 | Japan | 350/168 |

OTHER PUBLICATIONS

Caputi, William J., Jr., "Stretch: A Time–Transformation Technique", IEEE Transactions on Aerospace and Electronic Systems, vol. AES–7 No. 2, pp. 269–278.
Akhmanov, S. A., et al., "Self–Action of Wave Packets in a Nonlinear Medium and Femtosecond Laser Pulse Generation", Sov. Phys. Usp. 29 (7), Jul. 1986, pp. 642–677. (Pp. 647–649 appear to be particularly relevant.).
L. S. Telegin and A. S. Chirkin, "Reversal and Reconstruction of the Profile of Ultrashort Light Pulses", Sov. J. Quantum Electron. 15(1) Jan. 1985, pp. 101–102.
Brian J. Kolner, "Active Pulse Compression using an Integrated Electro–Optic Phase Modulator", Appl. Phys. Lett. 52(14), 4 Apr. 1988, pp. 1122–1124.
Tomasz Jannson; "Real–Time Imaging in High–Dispersive Media"; (Abstract).
Tomasz Jannson; "Temporal Fourier Transformation in Dispersive Media"; (Abstract).
Athanasios Papoulis; "Systems and Transforms with Applications in Optics"; McGraw–Hill Book Company; pp. 10–15, 198–207.
D. Grischkowsky and A. C. Balant; "Optical Pulse Compression based on Enhanced Frequency Chirping"; Applied Physics Letter, 41(1), 1 Jul. 1982; pp. 1–3.
Herman Hans; "Fields & Waves & Optoelectronics"; pp. 180–181.
W. J. Tomlinson et al., "Compression of Optical Pulses Chirped by Self–Phase Modulation in Fibers"; J. Opt. Soc. Am. B, vol. 1, No. 2, Apr. 1984; pp. 139–149.
M. Haner & W. S. Warren; "Synthesis of Created Optical Pulses by Time Domain Modulation in a Fiber–grating Compressor"; Appl. Phys. Lett. 52(18), 2 May 1988; pp. 1458–1460.

(List continued on next page.)

Primary Examiner—Ricky D. Shafer

[57] ABSTRACT

A temporal imaging system is presented consisting of a dispersive input path, a phase modulator producing a phase modulation substantially equal to $A+Bt^2$, and an output dispersive path. This temporal imaging system can be combined with other temporal lenses to image input signals in the same manner that spatial lenses can be used to image light from spatial sources. In particular, this temporal imaging system can be used to expand, compress and or invert input temporal signals.

5 Claims, 2 Drawing Sheets

OTHER PUBLICATIONS

Hiroki Nakatsuka et al.; "Nonlinear Picosecond–Pulse Propagation through Optical Fibers with Positive Group Velocity Dispersion"; Physical Review Letters, vol. 47, No. 13; 28 Sep. 1981; pp. 910–913.

A. M. Weiner et al.; "Synthesis of Phase–Coherent, Picosecond Optical Square Pulses"; Optics Letters; vol. 11, No. 3, Mar. 1986; pp. 153–155.

E. B. Treacy; "Compression of Picosecond Light Pulses"; Physics Letters, vol. 28A, No. 1; 21 Oct. 1968; pp. 34–35.

M. M. T. Loy; "The Dispersive Modulator–A New Concept in Optical Pulse Compression"; IEEE Journal of Quantum Electronics, vol. QE–13, No. 6; pp. 388–392.

John K. Wigmore and Daniel Grischkowsky; "Temporal Compression of Light"; IEEE Journal of Quantum Electronics; vol. QE–14, No. 4, Apr. 1978; pp. 310–315.

J. E. Bjorkholm et al.; "Conversion of CW Light into a Train of Subnanosecond Pulses using Frequency Modulation and the Dispersion of a Near–Resonant Atomic Vapor"; Applied Physics Letters, vol. 26, No. 10, 15 May 1975; pp. 564–566.

B. Zysset et al.; "200–femtosecond Pulses at 1.06 um Generated with a Double–Stage Pulse Compressor"; Optics Letters, vol. 11, No. 3, Mar. 1986; pp. 156–158.

R. L. Fork et al.; "Compression of Optical Pulses to Six Femoseconds by Using Cubic Phase Compensation"; Optics Letters, vol. 12, No. 7, Jul. 1987; pp. 483–485.

C. V. Shank et al.; "Compression of Femtosecond Optical Pulses"; Appl. Phys. Lett. 40(9), 1 May 1982; pp. 761–763.

Joseph A. Giordmaine et al.; "Compression of Optical Pulses"; IEEE Journal of Quantum Electronics, vol. QE–4, No. 5, May 1968; pp. 252–255.

Ken–ichi Kitayama and Shyh Wang; "Optical Pulse Compression by Nonlinear Coupling" Appl. Phys. Lett. 43(1), 1 Jul. 1983; pp. 17–18.

E. P. Ippen and C. V. Shank; "Dynamic Spectroscopy and Subpicosecond Pulse Compression"; Applied Physics Letters, vol. 27, No. 9, 1 Nov. 1975; pp. 488–490.

Edmond B. Treacy; "Optical Pulse Compression with Diffraction Gratings"; IEEE Journal of Quantum Electronics, vol. QE–5, No. 9, Sep. 1969; pp. 454–458.

A. M. Johnson et al., "80XSingle–Stage Compression of Frequency Doubled Nd:yttrium Aluminum Garnet Laser Pulses"; Appl. Phys. Lett. 44(8), 15 Apr. 1984; pp. 729–731.

J. P. Heritage et al.; "Spectral Windowing of Frequency–Modulated Optical Pulses in a Grating Compressor"; Appl. Phys. Lett. 47(2), 15 Jul. 1985; pp. 87–89.

J. R. Klauder et al., "The Theory and Design of Chirp Radars"; Bell System Technical Journal, vol. XXXIX, No. 4, Jul. 1960; pp. 745–748.

D. Grischkowsky; "Optical Pulse Compression"; Applied Physics Letters, vol. 25, No. 10, 15 Nov. 1974; pp. 566–568.

S. A. Akhmanov et al.; "H–5—Nonstationary Nonlinear Optical Effects and Ultrashort Light Pulse Formation"; IEEE Journal of Quantum Electronics, vol. QE–4, No. 10, Oct. 1968; pp. 598–605.

D. Clawin and U. Langmann; "Monolithic Multigigabit/s Silicon Decision Circuit for Applications in Fibre–Optic Communication Systems"; Electronics Letters, vol. 20, No. 11, 24 May 1984; pp. 471–472.

1

TEMPORAL IMAGING WITH A TIME LENS

BACKGROUND OF THE INVENTION

This invention relates in general to pulse compressors and relates more particularly to an optical system that can expand and compress optical pulses while substantially retaining the temporal profile of the pulse.

In the figures, the first digit of a reference numeral indicates the first figure in which is presented the element indicated by that reference numeral.

In a conventional optical pulse compressor like that illustrated in FIG. 1, a frequency sweep is imparted to a travelling wave pulse of light by a phase modulation mechanism so that the frequency at the trailing end of the pulse is higher or lower than at the leading end of the pulse. This swept frequency process is referred to as a "chirp" because an audio pulse of comparable shape sounds like the chirp of a bird. When this pulse is transmitted through a dispersive optical element in which the frequency components at the leading edge of the pulse travel slower than the frequency components at the trailing edge of the pulse, the trailing end of the pulse compresses toward the leading edge of the pulse producing a pulse of reduced width and increased amplitude.

In one class of embodiments of such pulse compressors, the frequency chirp is imparted to the input pulse by self-phase modulation in an optical fiber (see, for example, D. Grischkowsky and A. C. Balant, Appl. Phys. Lett. 41, 1 (1982)). In another class of embodiments, the frequency chirp is imparted by electro-optic phase modulation (see, for example, D. Grischkowsky, Appl. Phys. Lett. 25, 566 (1974); or B. H. Kolner, Appl. Phys. Lett. 52, 1122 (1988)). In either case, a quadratic or nearly quadratic time-varying phase shift across the temporal envelope of the pulse results. After the pulse is chirped, it passes through a dispersive delay line such as a diffraction grating-pair which produces temporal compression of the pulse (See, for example, Edmond B. Treacy, "Optical Pulse Compression With Diffraction Gratings", IEEE Journal of Quantum Electronics, Vol. QE-5, No. 9, September 1969).

SUMMARY OF THE INVENTION

In accordance with the illustrated embodiment, a pulse compressor is presented that operates on a temporal pulse in a manner analogous to the operation of an optical imaging system. This pulse compressor can therefore be viewed conceptually as a temporal imaging system that utilizes at least one temporal lens and at least two dispersive paths. This temporal imaging system is developed in analogy to a spatial imaging system.

Such a temporal imaging system provides a number of useful advantages. Just as a spatial optical imaging system can produce an image that is larger or smaller than the optical object, this temporal imaging system can be used to compress or expand an optical pulse. When this temporal imaging system is used to produce a temporal image compressed in time, it functions as a pulse compressor that converts an input pulse having the same shape as the input pulse but having a reduced temporal scale. Thus, particular optical waveforms could be prepared on a long time scale to allow accurate preparation of the waveform and then it can be compressed for applications in coherent spectroscopy and nonlinear pulse propagation experiments. Optimum long pulse shapes could be prepared for high power amplification and subsequent compression. For communications applications, data streams could be encoded at nominal rates and compressed and multiplexed for high density optical communications. As in other types of pulse compressors, this temporal imaging system can be used to produce narrower temporal pulses of increased amplitude as well as to produce pulses having steeper transitions. These steepened transitions are useful in high speed switching and these narrower pulses are useful in high speed sampling.

When this temporal imaging system is used to produce a temporal image expanded in time, it functions as a pulse expander that is analogous to an optical microscope. It can be used to expand ultrafast optical phenomena to a time scale that is accessible to conventional high-speed photodiodes. This temporal imaging system could extend the range of direct optical measurements to a regime that is now only accessible with streak cameras or nonlinear optical techniques.

In a streak camera, an optical pulse is directed onto the cathode of a cathode ray tube. The carrier frequency of the optical pulse is high enough that the photons have sufficient energy to emit electrons by photoelectric emission. As a result of this, an electron beam from the cathode is produced that has the same temporal variation as the temporal variation of the optical pulse. This electron beam is scanned across the face of the cathode ray tube, producing a streak that has the same spatial variation in intensity as the temporal variation in intensity of the optical beam. The spatial variation of the streak intensity is measured, thereby measuring the temporal variation of the optical pulse. Unfortunately, a streak camera has a temporal resolution limit of about 5 picoseconds and is limited to light of frequency greater than the work function of the cathode divided by Planck's constant.

Examples of pulse detectors utilizing nonlinear optical techniques are presented in Chapter 3 of "Ultrashort Light Pulses", Springer Verlag, 1st Edition, Volume 18, edited by S. L. Shapiro. Such techniques include second harmonic autocorrelation techniques and sum-frequency cross-correlation techniques.

In the second harmonic autocorrelation technique, an optical pulse is split into two beams that are injected along paths oriented relative to the crystal axes of a crystal such that an output beam is formed that has a component proportional to the product of these two pulses. The delay of the pulse in one beam relative to the pulse in the other beam is varied, thereby producing an output signal that varies in time as the autocorrelation function of this pulse. Such a pulse detector is useful in analyzing pulses that are generally Gaussian in shape, but are not useful in determining the temporal profile of more complicated pulses.

In the sum-frequency cross-correlation pulse detectors, a first beam contains a relatively wide pulse of complicated temporal profile and the other contains a much narrower substantially Gaussian shaped pulse. As the relative delay between these pulses is varied, the temporal profile of the first pulse in the first beam is determined as the cross-correlation between these two pulses.

Just as a spatial imaging system can produce an inverted image, the temporal imaging system can also produce an inverted image. In the temporal case of an inverted image, the leading edge of the input pulse becomes the trailing edge of the output pulse. Such temporal inversion can be useful in signal processing applications such as convolution where time reversed waveforms are needed.

DESCRIPTION OF THE PREFERRED EMBODIMENT

Figure 1:
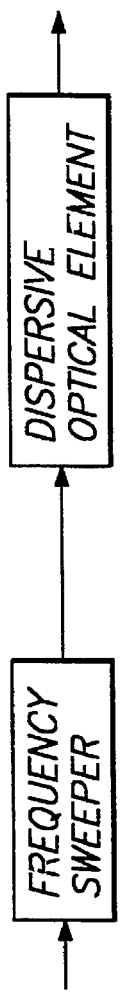
FIG. 1 illustrates a typical prior art pulse compressor such as is used in chirp radar.
Figure 2:
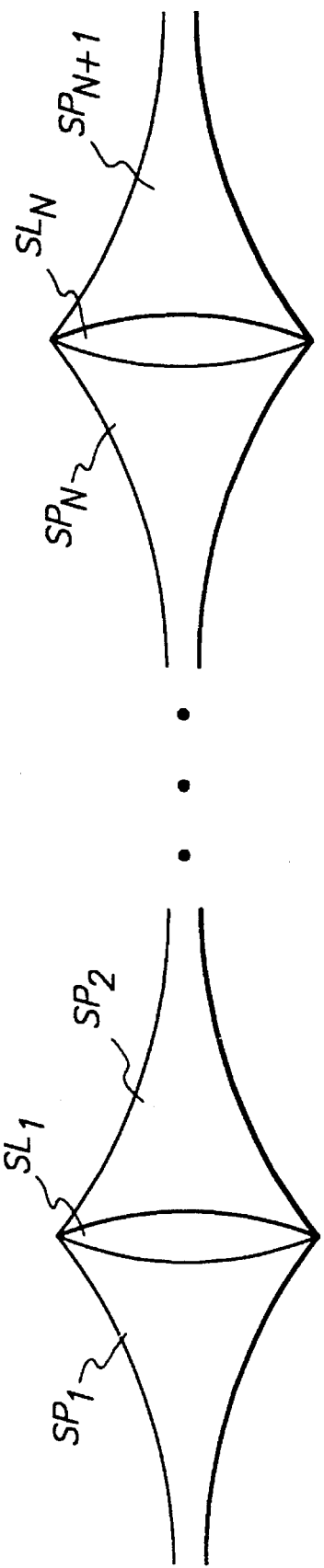
FIG. 2 illustrates a spatial imaging system.

The temporal imaging system is developed in analogy to a spatial imaging system. An optical spatial imaging system generally consists of a set of N spatial lenses $SL_1, \ldots, SL_N$, an input spatial path $SP_1$, an output spatial path $SP_{N+1}$ and $N-1$ spatial paths $SP_2, \ldots, SP_N$, each between a pair of adjacent lenses. Such a system is shown in FIG. 2. A temporal imaging system can therefore be produced if temporal analogs of the above optical lenses and spatial paths can be produced.

In the temporal imaging system presented herein, it is recognized that dispersion in a temporal path is the temporal analog of diffraction in an optical spatial path. It is recognized that a dispersive temporal path is the temporal analog of an optical spatial path diffraction. It is also recognized that a set of N+1 dispersive temporal paths can be combined with a set of N temporal lenses to produce a temporal imaging system. In the following, the temporal analog of a spatial optical lens is first discussed and then the temporal analog of the spatial paths is discussed.

Spatial Optical Lens

Figure 3:
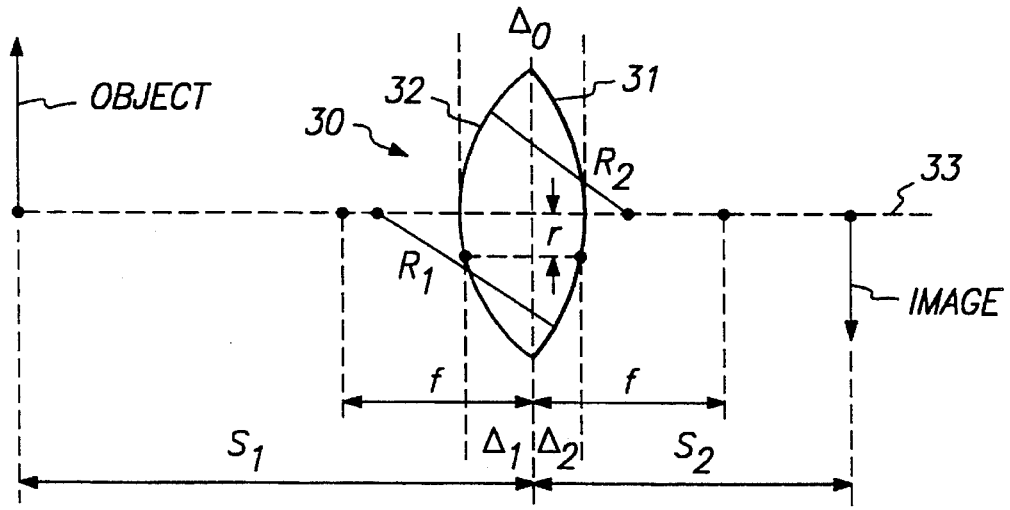
FIG. 3 illustrates the phase modulation effect of a spatial optical lens.

That an optical phase modulator can serve as a temporal lens to compress or expand an optical pulse is analogously illustrated by reference to FIG. 3. In FIG. 3 is shown a spatial lens 30 having a first spherical surface 31 of radius $R_1$, a second spherical surface 32 of radius $R_2$ and an index of refraction n. In the paraxial approximation, the optical rays are treated as if they pass through the lens along a path substantially parallel to the axis 33 of the lens. The presence of this lens increases the optical pathlength of a paraxial ray at a distance r from axis 33 of the lens by an amount $(n-1)\cdot\{\Delta_1(r)+\Delta_2(r)\}$ which, to lowest order in r is equal to $r^2/2f$ where f is defined to be equal to $\{(n-1)\cdot(R_2^{-1}-R_1^{-1})\}^{-1}$ and is called the focal length of the lens (a similar derivation is presented in J. W. Goodman, "Introduction to Fourier Optics"). Thus, in the paraxial approximation, to lowest order in f, a lens introduces to an optical wave of wavenumber k an additional phase $\Delta\phi=k\cdot r^2/2f$. Thus, a spatial lens can be viewed as a phase modulator that modulates the phase of a ray at distance r from axis 33 of the lens by an amount that varies approximately quadratically with r.

Temporal Lens

This quadratic phase variation in the spatial domain as a function of r can be mirrored in the temporal domain by use of a phase modulator that produces a phase modulation substantially equal to $\theta(t)=A+Bt^2$ for some constants A and B (i.e., the output signal $v_{out}(t)$ is equal to $v_{in}(t)e^{i\theta(t)}$ where $v_{in}(t)$ is the input signal to the phase modulator). Such phase modulation can be approximated by timing the modulation signal that drives the phase modulator such that the temporal pulse to be imaged is centered over an extremum of the phase modulation. The modulation signal can be any shape that has such extremum, provided that the shape is predominantly quadratic over the duration of the optical pulse. A sinusoidal modulation signal is particularly easy to generate and is therefore a useful choice. This temporal lens will function as a positive lens (i.e., a converging lens) or a negative lens (i.e., a diverging lens) depending on whether said extremum is a minimum or a maximum of the phase modulation.

The input temporal signal has the general form $u_{in}(t)e^{i\omega t}$ where $\omega$ is the angular frequency of the optical carrier signal and $u_{in}(t)$ is the modulation function of the carrier signal. This modulation function is also referred to as the "envelope function" of the optical pulse input to the temporal imaging system. The term A introduces a constant phase shift that does not affect the envelope function. Thus, such temporal modulation is an analog of the corresponding spatial imaging system in the paraxial ray limit.

As shown in texts on Fourier optics, such as the text "Introduction To Fourier Optics" by J. W. Goodman, the optical paths in the above spatial imaging system are governed by the mathematics of optical diffraction. It is well known that the mathematical equations for spatial diffraction are analogous to the mathematical equations for temporal dispersion (see, for example, S. A. Akhmanov, A. S. Chirkin, K. N. Drabovich, A. I. Kovrigin, R. V. Khoklov, and A. P. Sukhorukov, IEEE J. Quantum Electron. QE-4, 598 (1968)). There is a correspondence between the time variable in the dispersion problem and the transverse space variable in the diffraction problem.

Spatial Optical Paths

To see this correspondence, it will be shown that the envelope function of a temporal pulse obeys substantially the same differential equation as does a spatial wave. For a charge free medium, Maxwell's equations are $$\nabla \times E = -\partial B/\partial t \quad \nabla \cdot B = 0 \quad (1)$$

$$\nabla \times B = \partial D/\partial t \quad \nabla \cdot D = 0 \quad (2)$$

where E is the electric field vector, B is the magnetic field vector and D is the dielectric displacement vector equal to $\epsilon E$ (where $\epsilon$ is the dielectric constant). From standard vector calculus, these two equations imply that $$\nabla^2 E = \mu_0 \partial^2 D/\partial t^2 \quad (3)$$

For a monochromatic optical signal of angular frequency $\omega$ in the paraxial ray limit, E has the form $u(x,y,z)e^{i(kz-\omega t)}$ where $k^2 = \mu_0 \epsilon(\omega)\omega^2$ and u is an envelope function for the optical pulse. In this situation, equation (3) reduces to $$\nabla^2 u = 2ik\partial u/\partial z \quad (4)$$

The paraxial approximation also assumes that the term $\partial^2 u/\partial z^2$ is negligible in equation (4) so that the wave equation (3) reduces to the functional form of a 2-dimensional diffusion equation (4) in which the time parameter of a diffusion equation is replaced by the parameter z and in which the two spatial variables are x and y. Since this equation is linear in u, we can add together solutions for different frequencies so that this result is not limited only to monochromatic fields. It will now be shown that the dispersion problem also has the same functional form.

Temporal path in dispersive medium

A temporal pulse can be decomposed into a linear sum of monochromatic signals. The phenomenon of dispersion results in different propagation velocities for these various Fourier components. If we solve equation (3) for each plane wave Fourier component, we can sum together the whole spectrum with each corresponding propagation constant to construct the real time pulse. If we limit our analysis to z-directed plane waves, we let $$E(z,t)=u(z)e^{i\omega t} \quad (5)$$

and thus $$D(z,t)=\epsilon(\omega)u(z)e^{i\omega t} \quad (6)$$

When this form is used in equation (3), that equation becomes $$\partial^2 u/\partial z^2 = -\omega^2 \epsilon(\omega) u(z) \quad (3')$$

which has the solution $$u(z)=u_0 e^{i\beta z} \quad (7)$$

where $\beta$ is the frequency-dependent wave number:

$$\beta^2(\omega)=\mu_0 \epsilon(\omega) \omega^2. \quad (8)$$

From equations (3') (7), we see that the function u(z) satisfies the differential equation $$\partial u(z,\omega)/\partial z = -i\beta(\omega)u(z,\omega) \quad (9)$$

for a particular angular frequency $\omega$.

A temporal pulse consists of a slowly varying envelope function times a carrier travelling wave signal. Equivalently, this means that $u(\omega)$ is nonzero except in a narrow range about the carrier wave angular frequency $\omega_0$. Therefore, in equation (9), $\beta(\omega)$ can be expanded to second order in a power series about $\omega_0$ to give $$\partial u(z,\omega)/\partial z = -i\{\beta_0+\beta_1(\omega-\omega_0)+\beta_2(\omega-\omega_0)^2\}u(z,\omega) \quad (10)$$

where $\beta_k \equiv (1/k!) \partial^k \beta/\partial \omega^k$ evaluated at $\omega=\omega_0$. The temporal Fourier transform of this gives $$(\partial u(z,t)/\partial z + v_g^{-1} \cdot \partial u(z,t)/\partial t) = i\beta_2 \cdot \partial^2 u(z,t)/\partial t^2 \quad (11)$$

where $v_g$ is the group velocity of the pulse and is equal to $\beta_1^{-1}$. This equation can be further simplified by transformation to the travelling wave coordinates $\tau = t - z/v_g$ and z. In this coordinate system, equation (11) becomes $$\partial^2 u/\partial \tau^2 = (i\beta_2)^{-1} \partial u/\partial z \quad (12)$$

Equation (12) has the same functional form as equation (4) so this temporal pulse travelling in a dispersive medium satisfies substantially the same form of equation as spatial transmission of a wave with associated diffraction. Thus, the functional behavior of the temporal pulse through a dispersive medium corresponds to the functional behavior of a spatial beam along a spatial path. In equation (12), the travelling wave coordinate 96 is analogous to the lateral parameters x and y of equation (4). The parameter z plays the same role in both cases.

Figure 4:
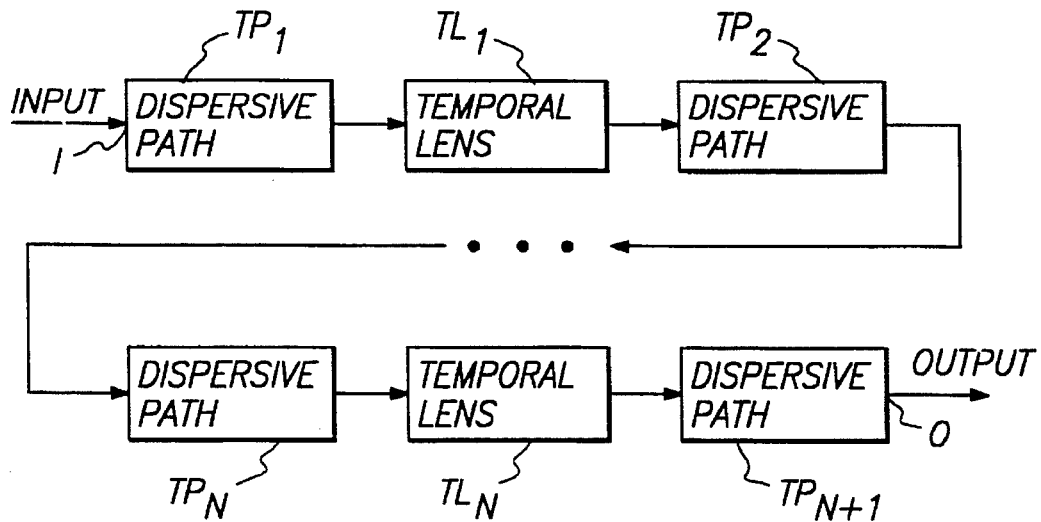
FIG. 4 illustrates a temporal imaging system.

FIG. 4 illustrates a temporal imaging system and is analogous to the spatial imaging system of FIG. 2. This temporal imaging system consists of N+1 temporal paths $TP_1, \ldots, TP_{N+1}$ and temporal lenses $TL_1, \ldots, TL_N$.

Because of this correspondence, a temporal imaging system generally consists of a set of N temporal lenses $TL_1, \ldots, TL_N$, an input signal path $TP_1$, an output temporal path $TP_{N+1}$ and N−1 temporal paths $TP_2, \ldots, TP_N$, each between a pair of adjacent temporal lenses. Because of the functional behavior between the spatial and temporal cases, the temporal imaging system exhibits the same magnification as the spatial imaging system. For example, for a single lens spatial imaging system, the magnification M is equal to $-S_2/S_1$ where $S_1$ is the distance from the object O to the spatial lens and $S_2$ is the distance from the spatial I to the image. $S_1$ and $S_2$ satisfy the lens equation $1/f=1/S_1+1/S_2$ where f is the focal length of the lens. Under conventional sign conventions, $S_1$ and $S_2$ are each positive for real objects and images and are each negative for virtual objects and images. When M is negative, this just indicates that the image has been inverted.

In the temporal domain, the inversion of the image means that the leading edge of the input pulse becomes the trailing edge of the output pulse. Such inversion can be used in signal processing applications, such as convolution, where time reverse waveforms are needed.

In the above analysis, the paraxial approximation was utilized for the spatial imaging system and, in the temporal imaging system, $\beta$ was expanded only to second order in $\omega-\omega_0$ and the modulation signal was also expanded only to second order in time about the time of an extremum point of that signal. If higher order terms are retained, then various types of aberration arise just as they do in the spatial imaging case. Thus, such aberrations should be small in the same way they must be small in the spatial imaging case. When greater clarity of imaging is required, these aberrations can be corrected in a way fully analogous to the spatial imaging case.

FIGS. 2 and 4 illustrate analogous spatial and temporal imaging systems in which the spatial and temporal lenses are collinear, but, just as there are noncollinear spatial imaging systems, there can also be noncollinear temporal imaging systems. Indeed, the equivalence between the spatial and temporal lenses and interconnecting signal paths means that there are temporal imaging systems analogous to each of the spatial imaging systems utilizing just lenses and interconnecting paths.

In the above discussion of the spatial optical lens, it was indicated that to the lowest nonzero order in the transverse distance r from the optical axis of the lens, the spatial optical lens introduces additional phase variation of the form $k \cdot r/2f$ where k is the wavenumber of the optical wave and where f is defined to be equal to $\{(n-1) \cdot (R_2^{-1}-R_1^{-1})\}^{-1}$ and is called the focal length of the lens. Similarly, in the above discussion of the temporal lens, it is indicated that the temporal phase modulator introduces a phase substantially equal to $A+Bt^2$. The A term introduces a constant phase that does not affect the shape of the pulse, but instead introduces a phase shift into the carrier signal on which the pulse is carried. The $Bt^2$ term is therefore analogous to the $k \cdot r^2/2f$ term in the spatial lens case and shows that the temporal lens has an effective temporal focal length $f_t$ equal to $\omega/2B$ where $\omega$ is the angular frequency of the carrier signal. Just as a simple spatial lens satisfies the optics equations:

$$1/s_1+1/s_2=1/f \quad (13)$$

and $$M=-s_2/s_1 \quad (14)$$

Figure 5:
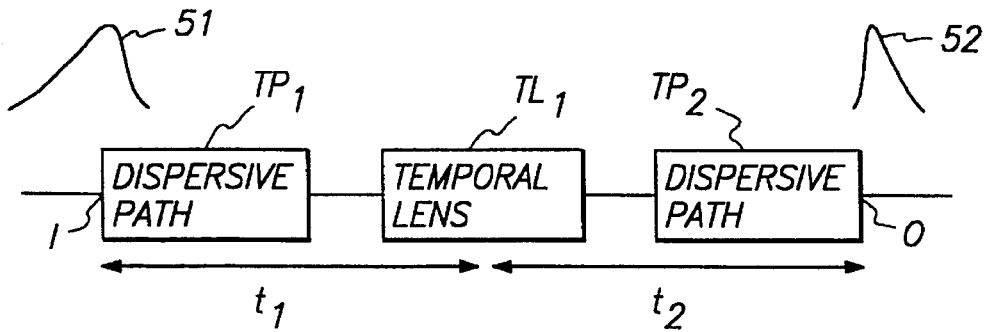
FIG. 5 illustrates the imaging and magnification effect of a temporal lens.

(where $s_1$ is the distance from the object to the lens and $s_2$ is the distance from the lens to the image), so also does the temporal pulse satisfy analogous equations $$1/t_1+1/t_2=1/f_t \quad (15)$$

and $$M_t = -t_2/t_1 \tag{16}$$

where $M_t$ is the temporal magnification factor, where $t_k$ (for k=1, 2) is equal to $2\omega_0 \cdot z_k \cdot \beta_2^{(k)}$, $z_k$ is the spatial length of the kth dispersive path $TP_k$, and $\beta_2^{(k)}$ is equal to one half of the second derivative of the wavenumber of the carrier signal in the kth dispersive medium evaluated at the frequency $\omega_0$ of the carrier signal. In FIG. 5, an input pulse 51 passing through temporal length $t_1$ of dispersive path $TP_1$, temporal lens $TL_1$, and temporal length $t_2$ of dispersive path $TP_2$, has a wider pulse width than the resulting output pulse 52, indicating that the absolute value of the magnification is less than 1 in that system. For the single temporal lens of FIG. 5, the magnification of the imaged pulse is negative so that the leading edge of input pulse 51 becomes the trailing edge of output pulse 52. Just as a plurality of lenses can be used in tandem to image an object field, so too can a plurality of temporal lenses be utilized in tandem to temporally image an input temporal waveform. The dispersive paths and focal times must be chosen to produce an imaged pulse at the output O.

We claim:

1. A temporal optical imaging system comprising:

a first temporal optical phase modulator $TL_1$;

a first dispersive optical path $TP_1$ coupling the first temporal optical phase modulator $TL_1$ to an input point I at which an optical input pulse is injected; and a second optical dispersive path coupling the first temporal optical phase modulator to an output O at which an output pulse is produced in response to the optical input pulse, the dispersion of these paths and the phase modulation of the phase modulator being such that the output pulse has substantially the same temporal shape as the input pulse and has a duration that is scaled to be $M_t$ times the duration of the input pulse, where $M_t$ is a magnification factor for this temporal imaging system, wherein the temporal optical phase modulator produces a phase modulation substantially equal to $A+B \cdot t^2$, for some constants A and B, over the time interval in which the optical pulse is within the phase modulator, where the time t=0 is defined to occur when the optical pulse is centered within the phase modulator.

2. A system as in claim 1 wherein the time t=0 at which said optical pulse is centered in the phase modulator is selected to coincide with an extremum of amount of phase modulation produced by the phase modulator.

3. A system as in claim 1 wherein the temporal optical phase modulator produces a phase modulation that is substantially a sinusoidal function of time and the period of this sine wave is selected such that, in a power series expansion of this sine wave about an extremum, over a time period equal to the pulse width of said input optical pulse, only the zeroth and second order terms are significant.

4. A system as in claim 1 further comprising:

a set of N–1 additional temporal optical phase modulators $TL_2, \ldots, TL_N$ for some positive integer N–1;

a set of N–1 additional optical dispersive paths $TP_3, \ldots, TP_{N+1}$, wherein the kth temporal phase modulator $TL_k$ is connected between temporal paths $TP_k$ and $TP_{k+1}$ wherein $TP_{N+1}$ is connected to output O and wherein the dispersion of these dispersive paths and the phase modulation of the phase modulators are such that the output pulse has substantially the same temporal shape as the input pulse and has a duration that is $M_t$ times the duration of the input pulse, where $M_t$ is a magnification factor for this temporal imaging system.

5. A system as in claim 1 wherein the temporal optical phase modulator produces a phase modulation substantially equal to $A+Ct+B \cdot t^2+Dt^3$, for some constants A, B, C and D, over the time interval in which the optical pulse is within the phase modulator, where the time t=0 is defined to occur when the optical pulse is centered within the phase modulator and where the constants C and D are chosen to correct imaging aberrations.

* * * * *